(12) United States Patent
Hallberg et al.

(10) Patent No.: US 6,520,460 B2
(45) Date of Patent: Feb. 18, 2003

(54) EXTENDIBLE LEG DEVICE

(75) Inventors: Edwin A. Hallberg, Midland, MI (US); Kenneth E. Staten, Clare, MI (US)

(73) Assignee: Stageright Corporation, Clara, MI (US)

( * ) Notice: Subject to any disclaimer, the term of this patent is extended or adjusted under 35 U.S.C. 154(b) by 0 days.

(21) Appl. No.: 09/904,551

(22) Filed: Jul. 16, 2001

(65) Prior Publication Data

US 2003/0010878 A1 Jan. 16, 2003

(51) Int. Cl.[7] ................................................ F16M 11/26
(52) U.S. Cl. .............................. 248/188.5; 248/188.8; 16/35 R
(58) Field of Search ......................... 16/35 R, 32, 33; 5/509.1; 248/188.2, 188.5, 188.8; 52/7–9, 169.12

(56) References Cited

U.S. PATENT DOCUMENTS

| | | | | | |
|---|---|---|---|---|---|
| 1,007,022 A | * | 10/1911 | Doll | ............................... | 16/32 |
| 1,468,469 A | * | 9/1923 | Green et al. | .................... | 16/32 |
| 2,777,546 A | * | 1/1957 | Kelley | ......................... | 16/35 R |
| 2,798,652 A | * | 7/1957 | Easton | ........................... | 16/33 |
| 2,841,410 A | * | 7/1958 | Kessler, Jr. et al. | ..... | 280/43.15 |
| 2,874,860 A | * | 2/1959 | King | .............................. | 16/19 |
| 3,091,816 A | | 6/1963 | Wetzel | ...................... | 20/1.123 |
| 3,222,827 A | | 12/1965 | Smith | ............................... | 52/9 |
| 3,676,881 A | * | 7/1972 | Duprey | .......................... | 5/510 |
| 3,879,796 A | * | 4/1975 | Whyte | ............................ | 16/33 |
| 4,588,203 A | * | 5/1986 | Anderson | ................... | 114/344 |
| 4,638,604 A | | 1/1987 | Rogers et al. | ................... | 52/6 |
| 4,912,887 A | | 4/1990 | Sullivan | .......................... | 52/7 |
| 4,927,105 A | * | 5/1990 | Habermann | ..................... | 16/19 |
| 5,050,353 A | | 9/1991 | Rogers et al. | ................... | 52/8 |
| 5,713,091 A | * | 2/1998 | Houchin | ..................... | 5/509.1 |
| 5,944,291 A | * | 8/1999 | Kato et al. | ..................... | 16/19 |

FOREIGN PATENT DOCUMENTS

| | | | | |
|---|---|---|---|---|
| FR | 2 418 319 | 9/1979 | ............. | E04H/3/28 |
| RU | 872710 | 10/1981 | ............. | E04H/3/12 |

\* cited by examiner

*Primary Examiner*—Korie Chan
(74) *Attorney, Agent, or Firm*—David M. Thimmig; Mayer, Brown, Rowe & Maw

(57) ABSTRACT

An extendible leg device for use in supporting a portion of a platform assembly above a floor surface. The extendible leg device has a leg tube that slidably receives a foot tube which is moved relative to the leg tube via selective rotation of an axle. The axle has a first link pivotally connected to a first end of a second link which second link is further pivotally connected at its second end to the foot tube.

33 Claims, 3 Drawing Sheets

EXTENDIBLE LEG DEVICE

BACKGROUND OF THE INVENTION

1. Field Of The Invention

The present invention generally relates to leg devices for load carrying platforms, such as in portable staging and seating equipment. More particularly, the invention relates to an extendible leg device for use in supporting a portion of a platform assembly above a floor surface.

2. Discussion of the Prior Art

Platform assemblies are widely used in staging and seating equipment for auditoriums, gymnasiums, and event halls to accommodate performers or spectators. Depending on the intended use, a facility may require such equipment to be moved between use and storage positions on a repeated basis. To accommodate such repeated movement of the equipment, manufacturers may incorporate wheels, such as of the caster type. However, straight legs significantly out perform caster wheels with respect to platform stability and load carrying capacity. Hence, it is desirable to have an extendible leg device which permits transportation of a load carrying platform assembly on caster wheels while also offering the advantage of removing the load from the wheels, in whole or in part, so as to "park" the equipment once it has reached its intended location for use or storage. Such parking enhances platform stability and load carrying capacity. Transportation and parking may be accomplished in at least two ways. The assembly could have attached wheels for floor engagement during transportation and then extendible legs having foot pads, where such legs extend to lift the assembly to remove at least a portion of the load from the wheels for parking. Alternatively, the assembly could have fixed legs for parking and extendible legs having wheels, where the legs having wheels extend to lift the assembly onto the wheels for use in transporting the assembly on a floor surface.

The extendible leg device of the present invention could be adapted for use with a platform assembly or the like in a side to side format or front to rear. Given that, in a position for use or storage, there may be obstructions, such as a side wall when using a side to side format, it is desirable to be able to access and control the raising or lowering of an extendible leg device from either end of the device.

It is further advantageous to conceal components of the extendible leg device within the structural components of the platform assembly, such as within commonly used tubular frame members, to protect such components from potential damage and to reduce undesirable pinch points.

It is also advantageous to achieve simple operation of such an extendible leg device, to enhance reliability and serviceability and so that it may be operated by unskilled individuals, with only a simple hand tool, such as a crank handle.

The present invention overcomes disadvantages of the prior art, while providing the above mentioned desirable features in an extendible leg device.

SUMMARY OF THE INVENTION

The purpose and advantages of the invention will be set forth in and apparent from the description and drawings that follow, as well as will be learned by practice of the invention.

The present invention is generally embodied in an extendible leg device for use with load carrying platforms, such as in staging or seating equipment. In a first aspect, the invention provides an extendible leg device having a plurality of substantially upright leg tubes, where each leg tube has a side wall, and a plurality of foot tubes, where each foot tube slidably engages a respective leg tube. The device further comprises an axle extending through the side wall of each leg tube and having a plurality of first links fixedly connected to the axle. A plurality of second links is provided with each second link pivotally connected at a first end to a first link and pivotally connected at a second end to a foot tube, wherein rotation of the axle causes slidable displacement of the foot tubes relative to the leg tubes.

In another aspect, the invention provides an extendible leg device having at least an extended position and a retracted position. The device comprises at least one substantially upright leg tube having a side wall and at least one foot tube slidably received in the at least one leg tube. An axle extends through the side wall of the leg tube and at least one first link is fixedly connected to the axle. At least one second link is pivotally connected at a first end to the at least one first link and pivotally connected at a second end to the at least one foot tube.

In still a further aspect, the present invention provides an extendible leg device having a plurality of substantially upright leg tubes, with each leg tube having a side wall. Also provided is a plurality of foot tubes, with each foot tube slidably engaging a respective leg tube. The device further comprises a substantially horizontal tube having a first end connected to a first upright leg tube and a second end connected to a second upright leg tube. An axle extends through the side wall of each leg tube and the substantially horizontal tube, and a plurality of first links is fixedly connected to the axle and disposed in the upright leg tubes. The device further comprises a plurality of second links, each second link being pivotally connected at a first end to a first link and pivotally connected at a second end to a foot tube, where rotation of the axle causes slidable displacement of the foot tubes relative to the leg tubes.

It is to be understood that both the foregoing general description and the following detailed description are exemplary and provided for purposes of explanation only, and are not restrictive of the invention, as claimed. Further features and objects of the present invention will become more fully apparent in the following description of the preferred embodiment and from the appended claims.

BRIEF DESCRIPTION OF THE DRAWINGS

In describing the preferred embodiment, reference is made to the accompanying drawing figures wherein like parts have like reference numerals, and wherein.

Figure 1:
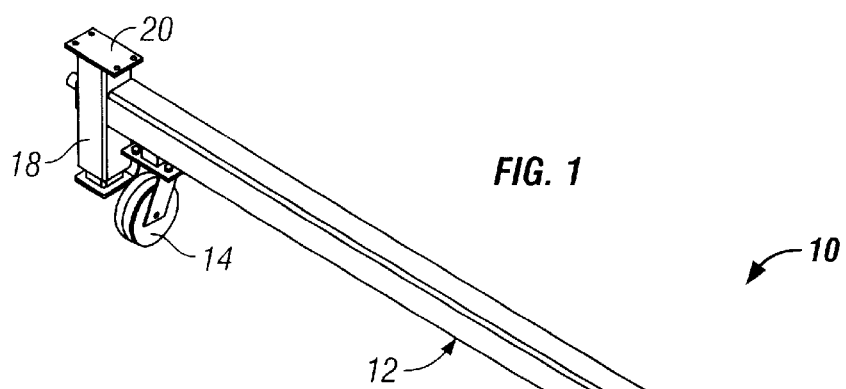
FIG. 1 is a front perspective view of an embodiment of a leg assembly of a platform assembly having a pair of caster wheels and employing an extendible leg device.

It should be understood that the drawings are not to scale and that certain aspects are illustrated in phantom views.

While considerable mechanical details of an extendible leg device, including details of fastening means and other plan and section views of the particular embodiment depicting the invention have been omitted, such detail is not per se part of the present invention and is considered well within the comprehension of those skilled in the art in light of the present disclosure. It also should be understood that the present invention is not limited to the preferred embodiment illustrated.

DETAILED DESCRIPTION OF THE PREFERRED EMBODIMENT

Referring generally to FIGS. 1–3 and 4A–4C, it will be appreciated that the extendible leg device 10 of the present invention generally may be embodied within numerous configurations of a leg assembly 12 for a load carrying platform assembly. Ideally, the extendible leg device 10 is to be used with portable platform assemblies that have wheels 14 mounted to a leg assembly 12, which may run side to side or front to rear relative to the platform assembly. This is shown, for instance, in FIG. 1 where a pair of caster wheels 14 are mounted to a substantially horizontal member 16. Wheels 14 may be mounted to member 16 in any number of ways and in FIG. 2, a flange of caster wheel 14 is fastened to a flange attached to but spaced from the bottom of member 16. It will be appreciated that the extendible leg device 10 alternatively may be used to provide adjustment between two platform heights for platform assemblies that do not have wheels.

Figure 2:
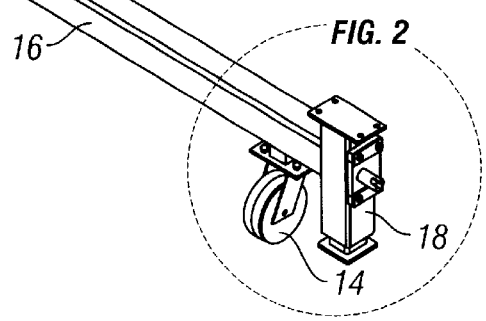
FIG. 2 is an expanded perspective view of a portion of the leg assembly in accordance with FIG. 1.
Figure 2:
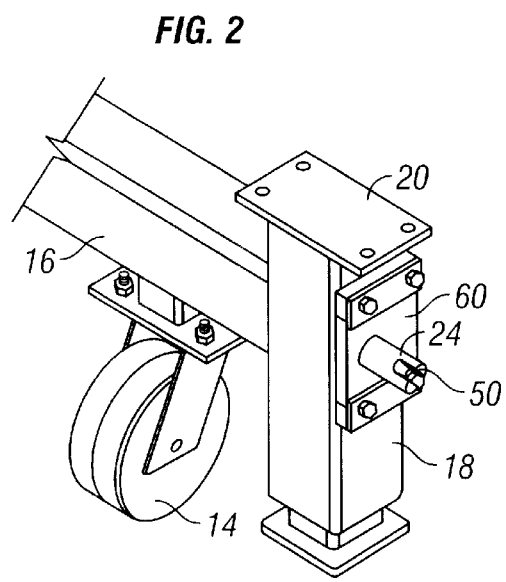

As shown in FIGS. 1 and 2, fixedly attached to each end of substantially horizontal member 16 is an upright leg tube 18. Leg tube 18 may have a mounting plate 20 at its upper end for connection to the remainder of the platform assembly. This configuration allows a common leg assembly 12 to be mounted to platforms of varying heights. Alternatively, leg tube 18 may extend further upward to be directly incorporated into the remainder of the platform structure. Each leg tube 18 is open at its lower end to receive a foot assembly 20, shown in FIG. 3. It will be appreciated that each upright leg tube 18 and member 16 need not be, but preferably is constructed from thin wall steel tube, preferably rectangular tube, where rectangular tube is understood to include square tube.

Figure 2A:
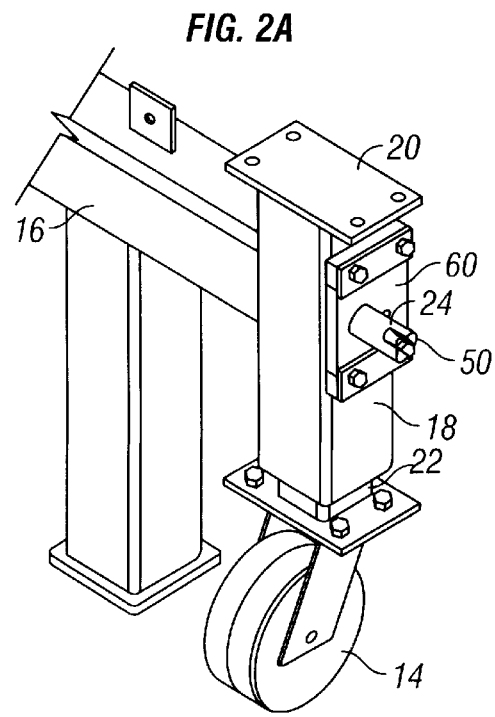
FIG. 2a is an expanded perspective view of an alternative embodiment of the assembly shown in FIG. 2.
Figure 3:
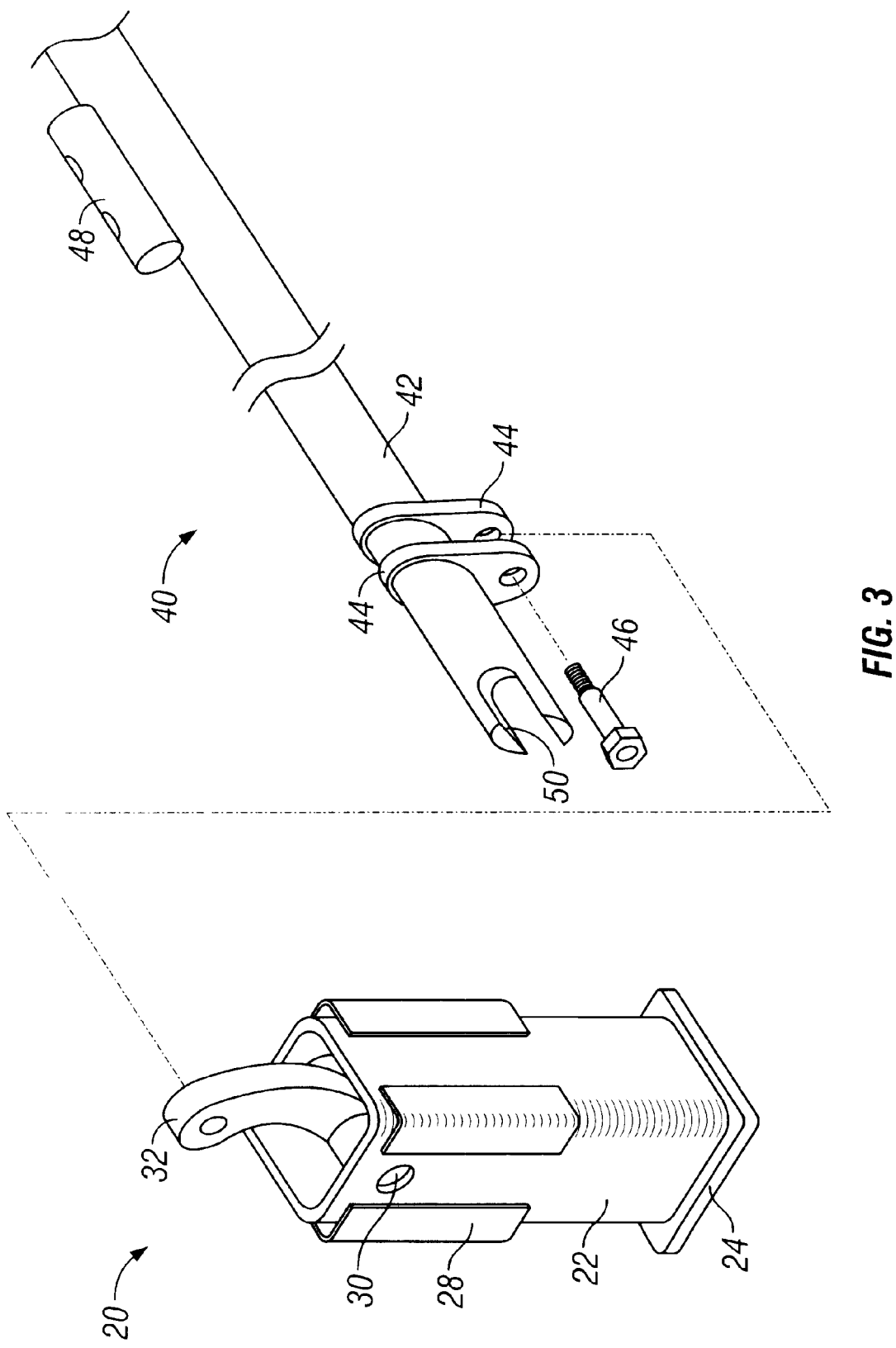
FIG. 3 is a front perspective view of a foot assembly and portions of an embodiment of an axle assembly as may be used in the device of FIGS. 1 and 2.
Figure 4C:
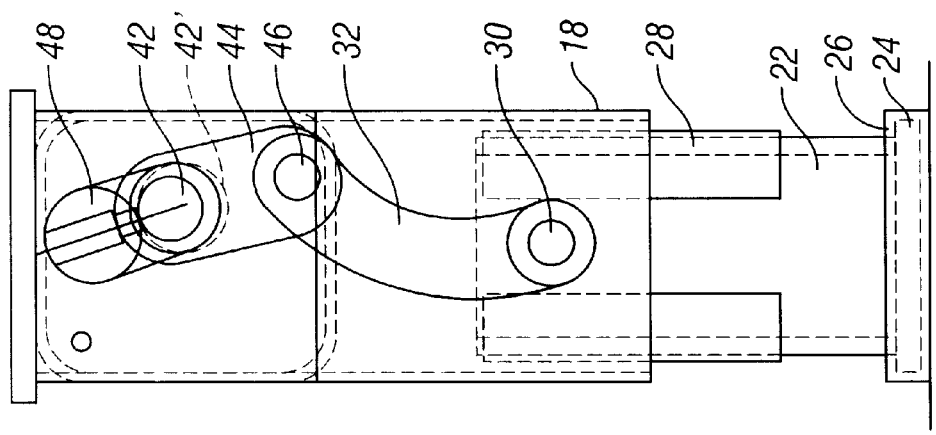
FIGS. 4A–4C are end views of three positions of the foot assembly in combination with the axle assembly of FIG. 3, as they are moved within the leg tube of FIG. 2.
Figure 4B:
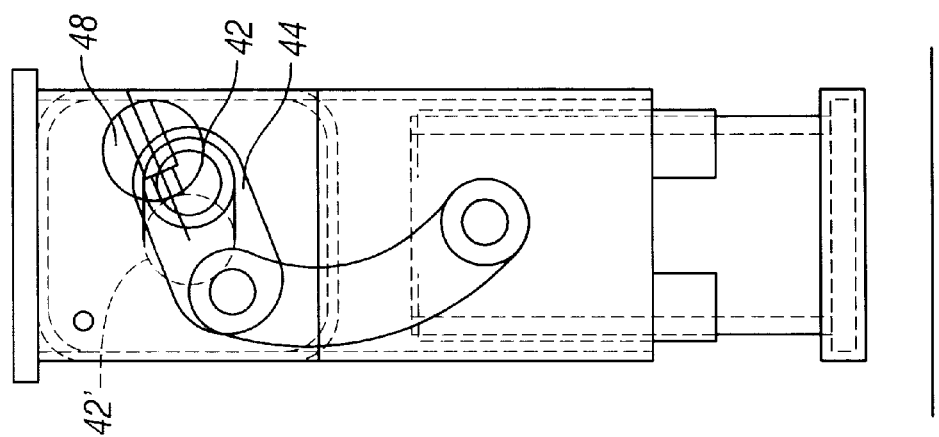
Figure 4A:
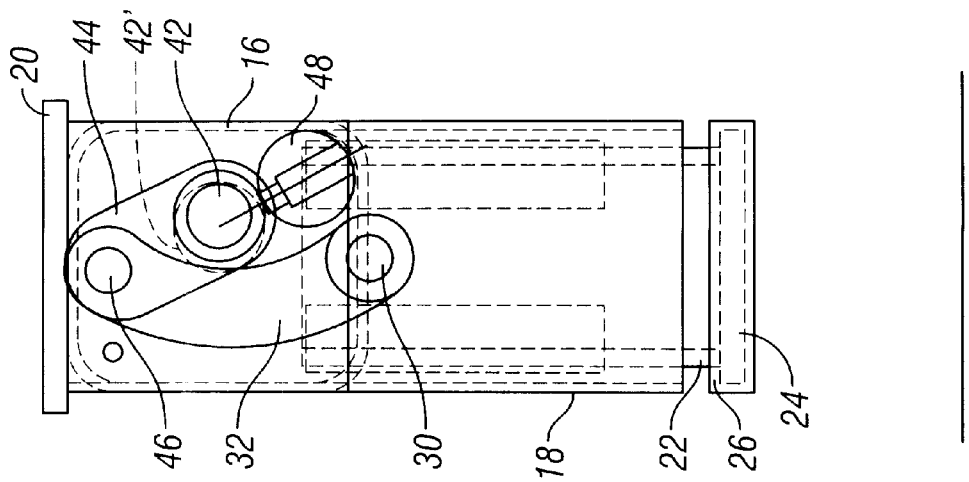

The foot assembly 20 of FIG. 3 includes an upright foot tube 22. A foot pad 24 is fixedly attached to the lower end of foot tube 22, such as by welding. As shown in FIG. 4A, foot pad 24 preferably carries a covering 26 to protect floor surfaces. The covering 26 may, for instance, be a detachable rubber cover or the foot pad 24 may be dipped in a plasticized rubber coating material or the like. One of skill in the art will appreciate that wheels 14 may be adapted for mounting to upright leg tubes 18 instead of member 16, which would still facilitate parking the platform assembly by extending foot tubes 22 relative to leg tubes 18. Further, as at least one alternative to the embodiment of FIG. 1, as shown in FIG. 2a, fixed legs could be used in place of the wheels shown, and wheels 14 could replace foot pads 24 at the bottom of foot tubes 22. This would facilitate parking the device when the foot tubes 22 with wheels are retracted, and transportation of the assembly when the foot tubes 22 are extended. It will further be appreciated that the wheels 14 need not necessarily be inboard of the legs.

In the preferred embodiment shown in FIG. 3, fixedly attached to the exterior four corners of upright foot tube 22 are right angle vertical guides 28. Guides 28 help prevent binding when a foot tube 22 slides within a leg tube 18. It will be appreciated that guides 28 may not be necessary or guides of different shape may be necessary depending on the sizes and shapes of leg tubes 18 and foot tubes 22.

Foot tube 22 also receives through its side walls a pivot 30. A cam link 32 is pivotally connected to pivot 30, and has an aperture proximate its distal end. It will be appreciated that one or more cam links 32 could be employed, and that cam link 32 may be of an alternative construction, such as a single piece having a plurality of projecting flanges.

The extendible leg device 10 also includes an axle assembly 40 having an axle 42 which preferably is constructed of circular steel tube to facilitate bearing surfaces for rotation of axle 42, and to reduce weight and inherent deflection associated with the weight of axle 42. Fixedly attached to and proximate each end of axle 42 is a pair of crank links 44. Each crank link 44 includes an aperture proximate its distal end to removably receive a pivot 46. It will be appreciated that a single crank link 44 may be employed, and that crank links 44 may be of an alternative construction, such as a single piece having a plurality of projecting flanges. Similarly, pivot 46 may be provided in any one of many ways available to one of skill in the art, and is shown in FIG. 3 as a shouldered bolt.

Also fastened to axle 42, proximate its mid-point and relatively opposite the distal end of crank links 44, is a lobe 48 preferably formed from round bar stock of a plastic material such as Delron™ or Nylon™. Lobe 48 may be of alternative constructions and may consist of a plurality of spaced apart or adjacent pieces attached to axle 42 in various ways. Lobe 48 is shown in FIG. 3 as attached to axle 42 using countersunk fasteners, such as machine screws. In the embodiment shown, each end of axle 42 has a slot 50 for engagement with a crank handle to achieve clock-wise and counter-clockwise rotation to axle 42. It will be appreciated that various alternative structures and tools may be employed to facilitate such rotation of axle 42.

Each leg tube 18 has openings in its side wall. Substantially horizontal member 16 need not be a tube. However, to conceal the axle assembly 40, member 16 is preferably a tube. In the preferred embodiment, the opening in leg tubes 18 are aligned with the interior of tube 16 to permit access to the interior of tube 16. Accordingly, the axle assembly 40 is received through the openings in the side wall of upright leg tubes 18 and through the interior of tube 16.

Each foot assembly 20 is received in the lower end of a leg tube 18. With the axle assembly 40 and foot assembly 20 in position, pivot 46 may be installed to pivotally connect crank links 44 to cam link 32. An axle retaining plate 60, having an axle receiving aperture, is removably mounted to each leg tube 18 to provide a bearing surface for axle 42 and to permit an end of axle 42 to project therethrough. Alternative constructions may be employed to retain axle 42, as well as to provide separate bearings for axle 42.

With the axle assembly 40 and foot assemblies 20 pivotally connected, axle 42 may be rotated to move foot tube 22 between a retracted position and an extended position. This is shown in FIGS. 4A–4C. In the preferred embodiment shown in FIG. 4A, the lobe 48 is trapped in the lower right-hand corner of the square tube 16. This effectively locks the extendible leg device 10 in a retracted position due to the generally downward deflection present in the center of axle 42, as depicted by 42'.

From the retracted position shown in FIG. 4A, if enough torque is applied via slot 50, axle 42 may be rotated counter-clockwise, as shown in FIG. 4B, forcing lobe 48 to run into the right-hand interior side wall of tube 16. Given that lobe 48 is mounted proximate the midpoint of elongated axle 42, this forces axle 42 to deflect or bend throughout its length, as depicted by the horizontally offset position 42' of the center of axle 42 in FIG. 4B. In light of the intended interference between lobe 48 and the interior wall of tube 16, it is desirable that lobe 48 be made of a plastic material to prevent binding and wear on the inside of tube 16. As axle 42 is rotated counter-clockwise from the retracted position, crank links 44 drive cam link 32 and foot tube 22 downward.

Axle 42 may continue to be rotated counter-clockwise until foot tube 22 goes slightly beyond full extension from leg tube 18, and crank links 44 contact the right-hand interior side wall of tube 16. In this extended leg position, lobe 48 becomes trapped against the interior top wall of tube 16, causing some generally downward deflection in the center of the axle as depicted by 42', and effectively locking the device 10 in the extended leg position shown in FIG. 4C. In the embodiment shown, due to the deflection of axle 42 and the positioning of lobe 48 within tube 16, some torque must be applied via the axle slot 50 to rotate axle 42 clockwise to unlock and begin retracting foot tube 22.

Alternative constructions of member 16, such as a circular tube will provide slightly different operation of device 10. For instance, lobe 48 would then preferably be adapted to be in constant contact with tube 16 to prevent foot tube 22 from inadvertently lowering when in the retracted position. Similarly, axle assembly 40 could be configured so as not to be concealed within member 16, and therefore member 16 may be, but need not be tubular. If axle assembly 40 does not extend through member 16, then lobe 48 on axle 42 could be made to contact an exterior surface of member 16 when axle 42 is in selected rotational positions.

It will be appreciated that platform assemblies are load bearing structures that may carry people and equipment, such as with portable staging and seating equipment. Therefore, extendible leg device 10 should be suitably constructed. For instance, the structural members of the device 10 preferably are constructed of thin wall tubing, straight bar stock, right angle bar stock, and plate of suitable materials, for instance, steel, alloy, aluminum or high strength plastics. Components may be joined in any number of conventional manners, such as by use of welding or with suitable fasteners.

It also should be understood that while a preferred embodiment has been described herein, any of a variety of fastening means and suitable materials of construction and dimensions may be used to satisfy the particular needs and requirements of the end user. It will be apparent to those skilled in the art that various modifications and variations can be made in the design and construction of an extendible leg device without departing from the scope or spirit of the present invention. Other embodiments of the invention will be apparent to those skilled in the art from consideration of the specification and practice of the invention disclosed herein.

What is claimed is:

1. An extendible leg device comprising:
    a plurality of substantially upright leg tubes, each leg tube having a side wall wherein said side wall has an interior and an exterior surface;
    a plurality of foot tubes, each foot tube slidably engaging said interior surface of said side wall of a respective leg tube;
    an axle extending through said side wall of each leg tube;
    a plurality of first links fixedly connected to said axle; and
    a plurality of second links, each second link being pivotally connected at a first end to a first link and pivotally connected at a second end to a foot tube, wherein rotation of said axle causes slidable displacement of said foot tubes relative to said leg tubes.

2. An extendible leg device in accordance with claim 1, wherein said device has at least a retracted position and an extended position.

3. An extendible leg device in accordance with claim 2, wherein said first links are disposed within said upright leg tubes and said first links engage said side wall of said upright leg tube when said device is in said extended position.

4. An extendible leg device in accordance with claim 1, wherein said second links are arcuate shaped.

5. An extendible leg device in accordance with claim 1, further comprising a foot pad connected to each foot tube.

6. An extendible leg device in accordance with claim 1, further comprising a substantially horizontal member having a first end connected to a first upright leg tube and a second end connected to a second upright leg tube.

7. An extendible leg device in accordance with claim 6, further comprising at least one wheel connected to said substantially horizontal member.

8. An extendible leg device in accordance with claim 6, wherein said substantially horizontal member is a tube.

9. An extendible leg device in accordance with claim 8, wherein said substantially horizontal tube is a rectangular tube.

10. An extendible leg device in accordance with claim 8, wherein said axle extends at least throughout said substantially horizontal tube.

11. An extendible leg device in accordance with claim 10, wherein said device further comprises at least one lobe connected to said axle between said first and second upright leg tubes.

12. An extendible leg device in accordance with claim 11 having at least a retracted position wherein said at least one lobe engages said substantially horizontal tube.

13. An extendible leg device in accordance with claim 12 having at least an extended position wherein said at least one lobe engages said substantially horizontal tube.

14. An extendible leg device having at least an extended position and a retracted position, said device comprising:
    at least one substantially upright leg tube having a side wall;
    at least one foot tube slidably received in said at least one leg tube;
    an axle extending through said side wall of said leg tube;
    at least one first link fixedly connected to said axle; and
    at least one second link pivotally connected at a first end to said at least one first link and pivotally connected at a second end to said at least one foot tube.

15. An extendible leg device in accordance with claim 14, wherein said device may be moved between said extended position and said retracted position by selective rotation of said axle.

16. An extendible leg device in accordance with claim 14, wherein said at least one second link is arcuate shaped.

17. An extendible leg device in accordance with claim 14, wherein said at least one first link engages said side wall of said upright leg tube when said device is in said extended position.

18. An extendible leg device in accordance with claim 14, further comprising a substantially horizontal tube having a first end connected to a first upright leg tube and a second end connected to a second upright leg tube.

19. An extendible leg device in accordance with claim 18, further comprising at least one wheel connected to said substantially horizontal tube.

20. An extendible leg device in accordance with claim 18, further comprising at least one wheel connected to said at least one foot tube.

21. An extendible leg device in accordance with claim 18, wherein said substantially horizontal tube is a rectangular tube.

22. An extendible leg device in accordance with claim 18, wherein said axle extends at least throughout said substantially horizontal tube.

23. An extendible leg device in accordance with claim 22, wherein said device further comprises at least one lobe connected to said axle between said first and second upright leg tubes.

24. An extendible leg device in accordance with claim 22, wherein said at least one lobe engages said substantially horizontal tube when said device is in said extended position.

25. An extendible leg device in accordance with claim 23, wherein said at least one lobe engages said substantially horizontal tube when said device is in said retracted position.

26. An extendible leg device comprising:
   a plurality of substantially upright leg tubes, each leg tube having a side wall;
   a plurality of foot tubes, each foot tube slidably engaging a respective leg tube;
   a substantially horizontal tube having a first end connected to a first upright leg tube and a second end connected to a second upright leg tube;
   an axle extending through said side wall of each leg tube and said substantially horizontal tube;
   a plurality of first links fixedly connected to said axle and disposed in said upright leg tubes; and
   a plurality of second links, each second link being pivotally connected at a first end to a first link and pivotally connected at a second end to a foot tube,
   wherein rotation of said axle causes slidable displacement of said foot tubes relative to said leg tubes.

27. An extendible leg device in accordance with claim 26, wherein said second links are arcuate shaped.

28. An extendible leg device in accordance with claim 26, further comprising at least one wheel connected to said substantially horizontal tube.

29. An extendible leg device in accordance with claim 26, further comprising at least one wheel connected to said at least one foot tube.

30. An extendible leg device in accordance with claim 26, wherein said substantially horizontal tube is a rectangular tube.

31. An extendible leg device in accordance with claim 26, wherein said device further comprises at least one lobe connected to said axle between said first and second upright leg tubes.

32. An extendible leg device in accordance with claim 31, wherein said at least one lobe engages said substantially horizontal tube when said device is in said extended position.

33. An extendible leg device in accordance with claim 31, wherein said at least one lobe engages said substantially horizontal tube when said device is in said retracted position.

* * * * *